United States Patent [19]

Nakasima

[11] Patent Number: 4,491,102
[45] Date of Patent: Jan. 1, 1985

[54] INTAKE DEVICE OF AN INTERNAL COMBUSTION ENGINE

[75] Inventor: Mikio Nakasima, Toyota, Japan

[73] Assignee: Toyota Jidosha Kabushiki Kaisha, Aichi, Japan

[21] Appl. No.: 406,889

[22] Filed: Aug. 10, 1982

[30] Foreign Application Priority Data

Aug. 19, 1981 [JP] Japan .............................. 56-121765[U]
Aug. 20, 1981 [JP] Japan ................................ 56-129419

[51] Int. Cl.³ .......................................... F02M 35/10
[52] U.S. Cl. ................................ 123/188 M; 123/308
[58] Field of Search ............... 123/52 M, 188 M, 306, 123/308, 432

[56] References Cited

U.S. PATENT DOCUMENTS

| 3,850,479 | 11/1974 | Boyhont et al. | 302/29 |
| 4,159,011 | 6/1979 | Sperry | 123/188 M |
| 4,174,686 | 11/1979 | Shimizu et al. | 123/308 |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanishi et al. | 123/188 M |
| 4,411,226 | 10/1983 | Okumura et al. | 123/188 M |

FOREIGN PATENT DOCUMENTS

| 2059008 | 6/1972 | Fed. Rep. of Germany . | |
| 2308327 | 10/1973 | Fed. Rep. of Germany | 123/188 M |
| 0143289 | 8/1980 | German Democratic Rep. | 123/188 M |
| 0127113 | 9/1977 | Japan | 123/188 M |
| 0058129 | 5/1979 | Japan . | |
| 0054922 | 5/1981 | Japan . | |
| 0068519 | 4/1982 | Japan . | |

Primary Examiner—Parshotam S. Lall
Assistant Examiner—W. R. Wolfe
Attorney, Agent, or Firm—Parkhurst & Oliff

[57] ABSTRACT

An engine comprising an intake port which has a helical portion and a separating wall projecting downwardly from the upper wall of the intake port. The separating wall defines an inlet passage portion tangentially connected to the helical portion, and a bypass passage interconnecting the inlet passage portion to the helical portion. A rotary valve is arranged in the bypass passage and actuated by a vacuum operated diaphragm apparatus. The rotary valve is opened when the amount of air fed into the cylinder of an engine is increased beyond a predetermined value.

22 Claims, 23 Drawing Figures

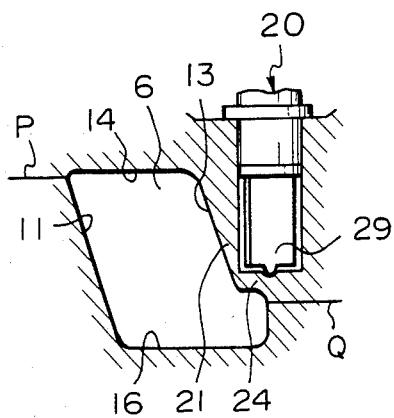
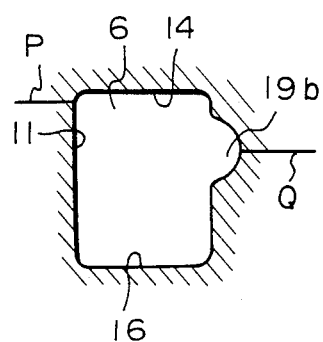
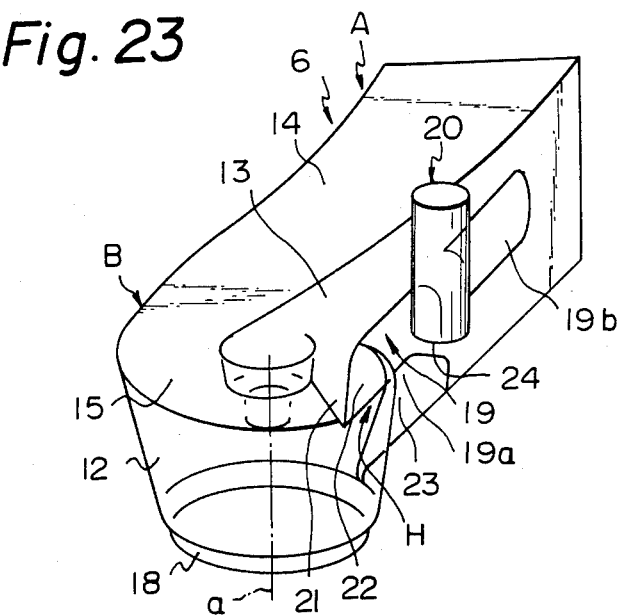

4,491,102

INTAKE DEVICE OF AN INTERNAL COMBUSTION ENGINE

BACKGROUND OF THE INVENTION

The present invention relates to a flow control device of a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closed type flow control valve, actuated by an actuator, is arranged in the bypass passage and opened under the operation of the actuator when the amount of air fed into the cylinder of the engine is larger than a predetermined amount. In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port, and thus, enabling high volumetric efficiency. However, such a helically-shaped intake port has a complicated construction itself, and therefore, in the case where the bypass passage is additionally provided, the shape of the helically-shaped intake port becomes extremely complicated. This results in a problem in that it is difficult to form a helically-shaped intake port equipped with such a bypass passage in the cylinder head.

SUMMARY OF THE INVENTION

An object of the present invention is to provide a helically-shaped intake port having a novel construction which can be easily manufactured.

According to the present invention, there is provided an intake device of an internal combustion engine comprising: an intake valve having a valve stem; an axially extending intake port passage having an inlet opening at one end thereof and having an outlet opening at the other end thereof, said intake port passage having a substantially cylindrically extending circumferential wall which circumferentially extends about said valve stem for defining therein a helical portion having a helix terminating portion, a first side wall which extends between said inlet opening and said circumferential wall along an axis of said intake port passage, a second side wall which extends between said inlet opening and said circumferential wall along the axis of said intake port passage and is arranged to face said first side wall, an upper wall which extends between said inlet opening and said circumferential wall along the axis of said intake port passage, and a bottom wall which extends between said inlet opening and said circumferential wall along the axis of said intake port passage; a separating wall projecting downwardly from said upper wall and spaced from said bottom wall, said separating wall extending along the axis of said intake port passage and being spaced from said first side wall for defining therebetween an inlet passage portion tangentially connected to said helical portion, said separating wall being spaced from said second side wall for defining therebetween a bypass passage which interconnects said inlet passage portion to said helix terminating portion; normally closed valve means arranged in said bypass passage and having a lower end which is spaced from said bottom wall for controlling the flow area of said bypass passage; and actuating means for actuating said valve means in response to the change in the operating condition of the engine to open said valve means when the engine is operating at a high speed under a heavy load.

The present invention may be more fully understood from the description of preferred embodiments of the invention set forth below, together with the accompanying drawings.

BRIEF DESCRIPTION OF THE DRAWINGS

In the drawings:

FIG. 21 is a cross-sectional view taken along the line XXI—XXI in FIG. 18;

FIG. 22 is a cross-sectional view taken along the line XXII—XXII in FIG. 18; and FIG. 23 is a perspective view schematically illustrating the shape of the helically-shaped intake port illustrated in FIG. 16.

DESCRIPTION OF PREFERRED EMBODIMENTS

Figure 1:
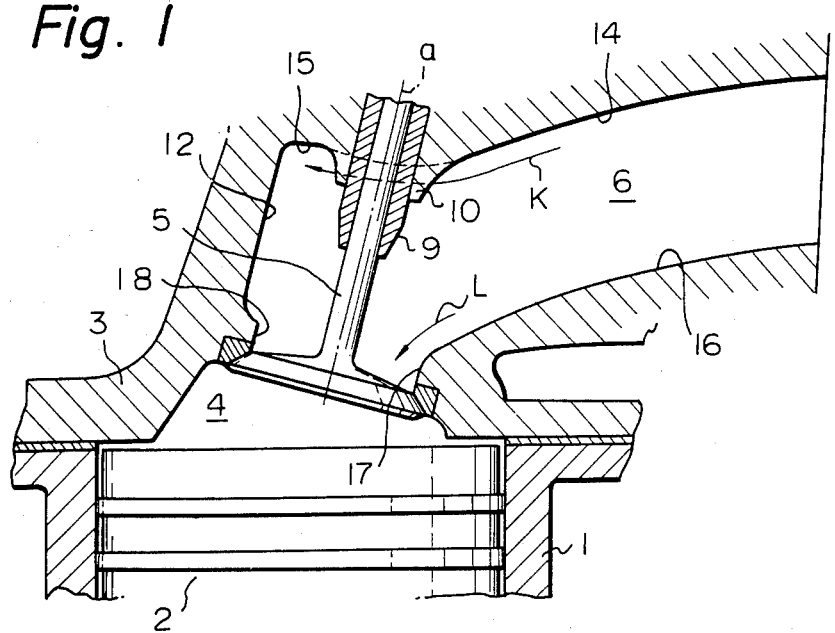
FIG. 1 is a cross-sectional side view of a helically-shaped intake port according to the present invention, taken along the inlet passage portion.
Figure 2:
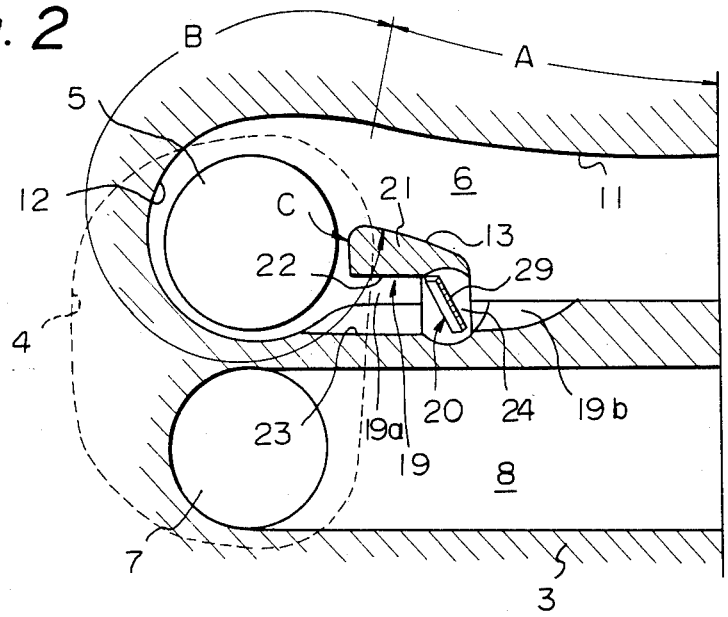
FIG. 2 is a cross-sectional plan view of the cylinder head.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 7a an exhaust port formed in the cylinder head 3. A spark plug (not shown) is arranged in the combustion chamber 4.

Figure 5:
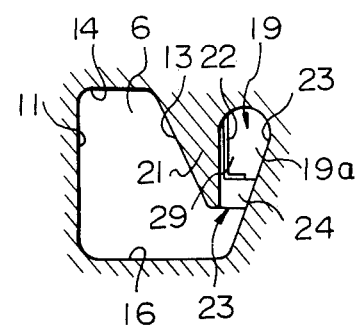
FIG. 5 is a cross-sectional view taken along the line V—V in FIG. 3.
Figure 6:
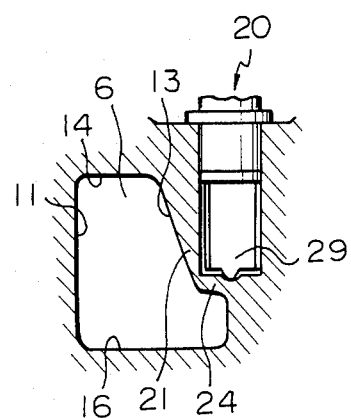
FIG. 6 is a cross-sectional view taken along the line VI—VI in FIG. 3.
Figure 7:
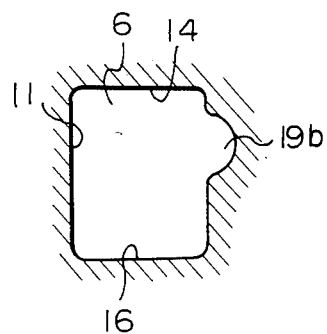
FIG. 7 is a cross-sectional view taken along the line VII—VII in FIG. 3.

As illustrated in FIG. 1, a downwardly projecting frustum-shaped projection 10 for supporting a stem guide 9 is formed in one piece on the upper wall of the helically-shaped intake port 6, and the tip of the stem guide 9 projects from the tip of the frustum-shaped projection 10. As illustrated in FIG. 2, the helically-shaped intake port 6 comprises a substantially straight extending inlet passage portion A and a helical portion B, and the inlet passage portion A is tangentially connected to the helical portion B. As illustrated in FIGS. 1 through 8, the side wall 11 of the inlet passage portion A, which is located remote from the helix axis a, is substantially vertically arranged and smoothly connected to the side wall 12 of the helical portion B, which circumferentially extends about the helix axis a. On the other hand, as illustrated in FIGS. 5 and 6, the side wall 13 of the inlet passage portion A, which is located near the helix axis a, is formed so that it is inclined so as to be directed downward in the downstream region of the inlet passage portion A, which is located near the helical portion B. The upper portion of the inclined side wall 13 is smoothly connected to the circumferential wall of the projection 10 illustrated in FIG. 1, and the lower portion of the inclined side wall 13 is connected to the side wall 12 of the helical portion B at the helix terminating portion C of the helical portion B.

Figure 8:
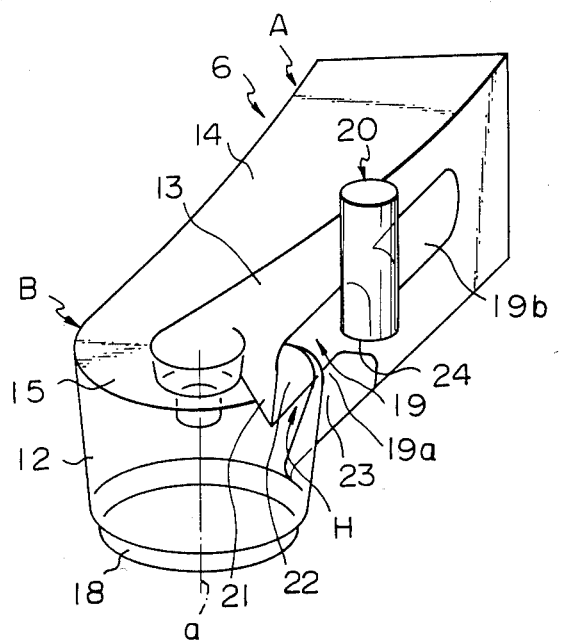
FIG. 8 is a perspective view schematically illustrating the shape of a helically-shaped intake port.

As is understood from FIG. 8, the width of the upper wall 14 of the inlet passage portion A is gradually reduced towards the helical portion B, and the upper wall 14 is smoothly connected to the upper wall 15 of the helical portion B. In addition, the bottom wall 16 of the inlet passage portion A extends towards the helical portion B in substantially parallel to the upper wall 14 and then is connected to a cylindrical outlet portion 18 via a smoothly curved wall 17.

As illustrated in FIGS. 2 through 8, a bypass passage 19, interconnecting the central portion of the longitudinal length of the inlet passage portion A to the helix terminating portion C of the helical portion B, is formed in the cylinder head 3, and a rotary valve 20 functioning as an opening control valve is arranged in the bypass passage 19. The bypass passage portion 19a, located downstream of the rotary valve 20, is separated from the inlet passage portion A by a separating wall 21 which projects downwardly from the upper wall 14 of the inlet passage portion A. The lower end of the separating wall 21 is slightly spaced upward from the bottom wall 16 of the inlet passage portion A. Therefore, the lower space of the bypass passage portion 19a is in communication with the inlet passage portion A within the transverse cross-section of the intake port 6 over the entire length of the bypass passage portion 19a. One of the side walls 22 of the bypass passage portion 19a, that is, the side wall 22 of the separating wall 21, which is located opposite to the inclined side wall 13, is substantially vertically arranged. The other side wall 23 of the bypass passage portion 19a is smoothly connected to the bottom wall 16 of the inlet passage portion A and inclined so as to be directed upward. Consequently, the lower space of the bypass passage portion 19a formed between the side wall 22 and the inclined side wall 23 forms a narrow width portion H. On the other hand, the bypass passage portion 19b, located upstream of the rotary valve 20, is formed as a semi-circular cross-sectional groove which is open to the inlet passage portion A. A bridge 24, interconnecting the side wall 22 of the separating wall 21 to the side wall 23 of the bypass passage 19, is formed beneath the rotary valve 20 for rotatably supporting the lower end of the rotary valve 20. However, this bridge 24 may be omitted.

Figure 9:
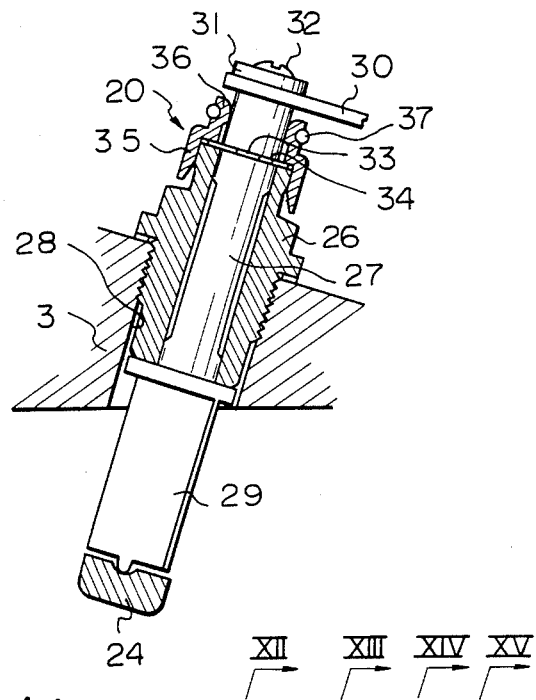
FIG. 9 is a cross-sectional side view of a rotary valve.

As illustrated in FIG. 9, the rotary valve 20 comprises a rotary valve holder 26 and a valve shaft 27 rotatably supported by the rotary valve holder 26. The rotary valve holder 26 is screwed into and fixed into a valve insertion bore 28 formed in the cylinder head 3. A thin plate-shaped valve body 29 formed on the lower end of the valve shaft 27, and the lower end of the valve body 29 is supported by the bridge 24. An arm 30 is fixed onto the top end of the valve shaft 27 by means of a bolt 32 via a washer 31. A ring groove 33 is formed on the outer circumferential wall of the valve shaft 27, and, for example, an E-shaped positioning ring 34 is fitted into the ring groove 33 for positioning the valve body 29. In addition, a seal member 35 is fitted onto the upper portion of the rotary valve holder 26, and a seal portion 36 of the seal member 35 is pressed in contact with the outer circumferential wall of the valve shaft 27 by means of an elastic ring 37.

Figure 10:
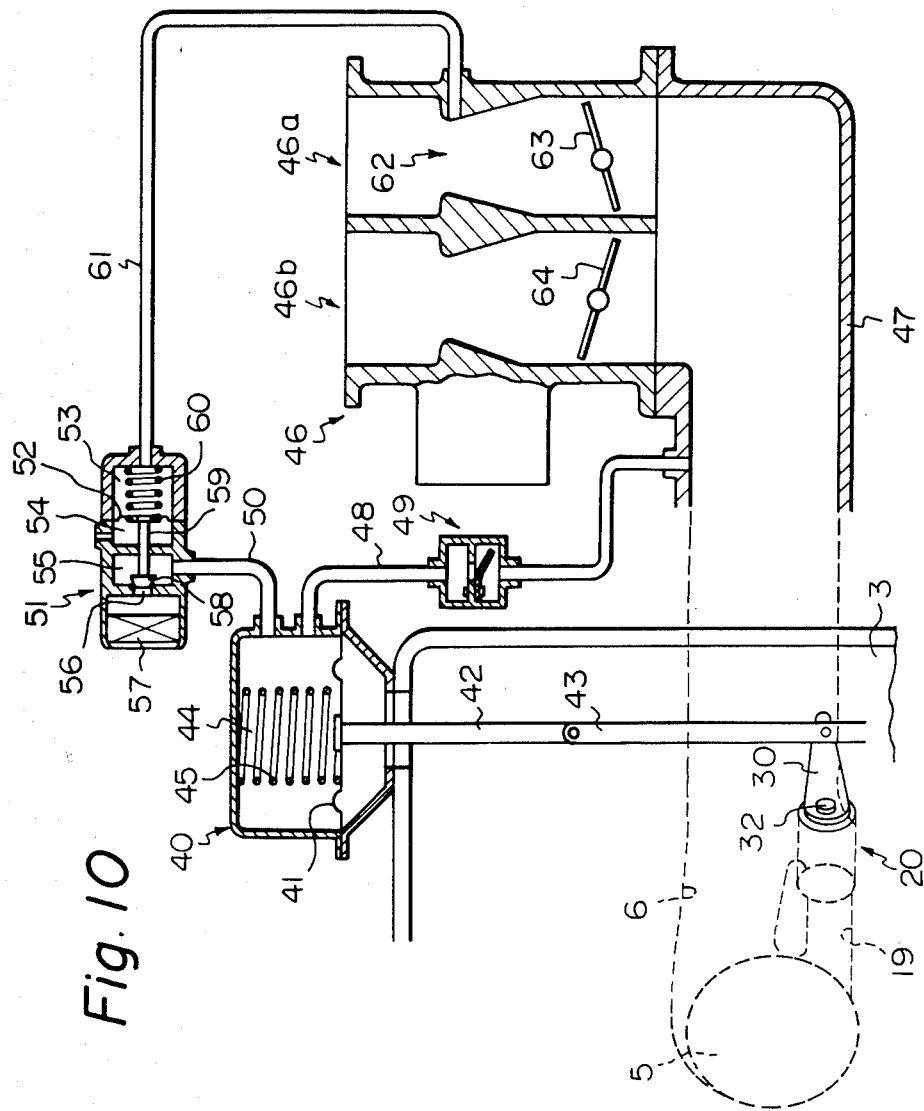
FIG. 10 is a view illustrating the entirety of a rotary valve drive control device.
Figure 12:
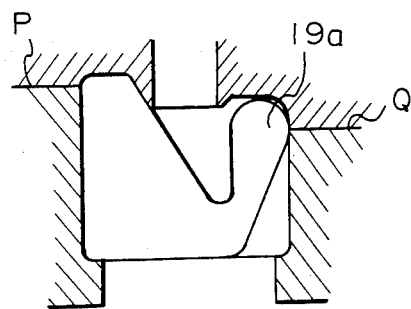
FIG. 12 is a cross-sectional view taken along the line XII—XII in FIG. 11.
Figure 13:
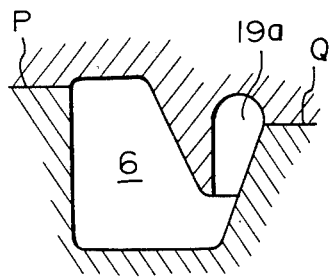
FIG. 13 is a cross-sectional view taken along the line XIII—XIII in FIG. 11.

Referring to FIG. 10, the tip of the arm 30 fixed onto the top end of the rotary valve 20 by means of the bolt 32 is connected via a connecting rod 43 to a control rod 42 which is fixed onto a diaphragm 41 of a vacuum operated diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound type carburetor 46 comprising a primary carburetor 46a and a secondary carburetor 46b, is mounted on the cylinder head 3, and the vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. This control valve 51 comprises a vacuum chamber 53 and an atmospheric pressure chamber 54 which are separated by a diaphragm 52. In addition, the control valve 51 further comprises a valve chamber 55 arranged adjacent to the atmospheric pressure chamber 54. The valve chamber 55 is connected, at one end, to the vacuum chamber 44 via the atmosphere conduit 50 and, at the other end, to the atmosphere via a valve port 56 and an air filter 57. A valve body 58, controlling the opening operation of the valve port 56, is arranged in the valve chamber 55 and connected to the diaphragm 52 via a valve rod 59. A compression spring 60 for biasing the diaphragm 52 is inserted into the vacuum chamber 53, and the vacuum chamber 53 is connected to a venturi portion 62 of the primary carburetor A via a vacuum conduit 61.

The carburetor 46 is a conventional carburetor. Consequently, when the opening degree of a primary throttle valve 63 is increased beyond a predetermined degree, a secondary throttle valve 64 is opened. When the primary throttle valve 63 is fully opened, the secondary throttle valve 64 is also fully opened. The level of vacuum produced in the venturi portion 62 of the primary carburetor 46a is increased as the amount of air fed into the cylinder of the engine is increased. Consequently, when a great vacuum is produced in the venturi portion 62, that is, when the engine is operating at a high speed under a heavy load, the diaphragm 52 of the control valve 51 moves towards the right in FIG. 10 against the compression spring 60. As a result of this, the valve body 58 opens the valve port 56. Thus, the vacuum chamber 44 of the diaphragm apparatus 40 becomes open to the atmosphere. At this time, the diaphragm 41 moves downward in FIG. 10 due to the spring force of the compression spring 45 and, thus, the rotary valve 20 is rotated and fully opens the bypass passage 19.

On the other hand, in the case wherein the opening degree of the primary throttle valve 63 is small, since the vacuum produced in the venturi portion 62 is small, the diaphragm 52 of the control valve 51 moves towards the left in FIG. 10 due to the spring force of the compression spring 60. As a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifold 47 becomes greater than that of the vacuum produced in the vacuum chamber 44, and since the check valve 49 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the control valve 51 remains closed. If a vacuum is produced in the vacuum chamber 44, the diaphragm 41 moves upward in FIG. 10 against the compression spring 45. As a result, the rotary valve 20 is rotated and closes the bypass passage 19. Consequently, when the engine is operating at a low speed under a light load, the bypass passage 19 is closed by the rotary valve 20. In the case wherein the engine speed is low even if the engine is operating under a heavy load, and in the case wherein the engine is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum vacuum, the bypass passage 19 is closed by the rotary valve 20.

As mentioned above, when the engine is operating at a low speed under a light load, that is, when the amount of air fed into the cylinder of the engine is small, the rotary valve 20 closes the bypass passage 19. At this time, a part of the mixture introduced into the inlet passage portion A moves forward along the upper walls 14, 15, as illustrated by the arrow K in FIG. 1, and the remaining part of the mixture impinges upon the inclined side wall 13 and is deflected downwards. As a result, the remaining part of the mixture flows into the mixture outlet portion 18 without swirling, as illustrated by the arrow L in FIG. 1. Since the width of the upper wall 14 is gradually reduced towards the helical portion B, the cross-section of the flow path of the mixture flowing along the upper wall 14 is gradually reduced towards the helical portion B. Thus, the velocity of the mixture flowing along the upper wall 14 is gradually increased. Then, the mixture thus speeded up flows along the upper wall 12 of the helical portion B. Thus, a strong swirl motion is created in the helical portion B. This swirl motion causes a swirl motion of the mixture flow illustrated by the arrow L in FIG. 1 and flowing into the mixture outlet portion 18. Then, the swirling mixture flows into the combustion chamber 4 via the valve gap formed between the intake valve 5 and its valve seat and causes a strong swirl motion in the combustion chamber 4.

When the engine is operating at a high speed under a heavy load, that is, when the amount of air fed into the cylinder of the engine is large, since the rotary valve 20 opens the bypass passage 19, a part of the mixture introduced into the inlet passage portion A is fed into the helical portion B via the bypass passage 19 having a low flow resistance. As mentioned above, when the engine is operating at a high speed under a heavy load, since the rotary valve 20 opens, the entire flow area of the intake port 6 is increased, and a large amount of the mixture is fed into the helical portion B via the bypass passage 19 having a low flow resistance. As a result of this, it is possible to obtain a high volumetric efficiency. In addition, by forming the inclined side wall 13 as mentioned previously, since a part of the mixture introduced into the inlet passage portion A flows into the mixture outlet portion 18 along the smoothly curved wall 17 without swirling, the flow resistance of the helically-shaped intake port 6 becomes considerably small as compared with that in a conventional helically-shaped intake port. As a result of this, a high volumetric efficiency can be ensured when an engine is operating at a high speed under a heavy load.

Figure 3:
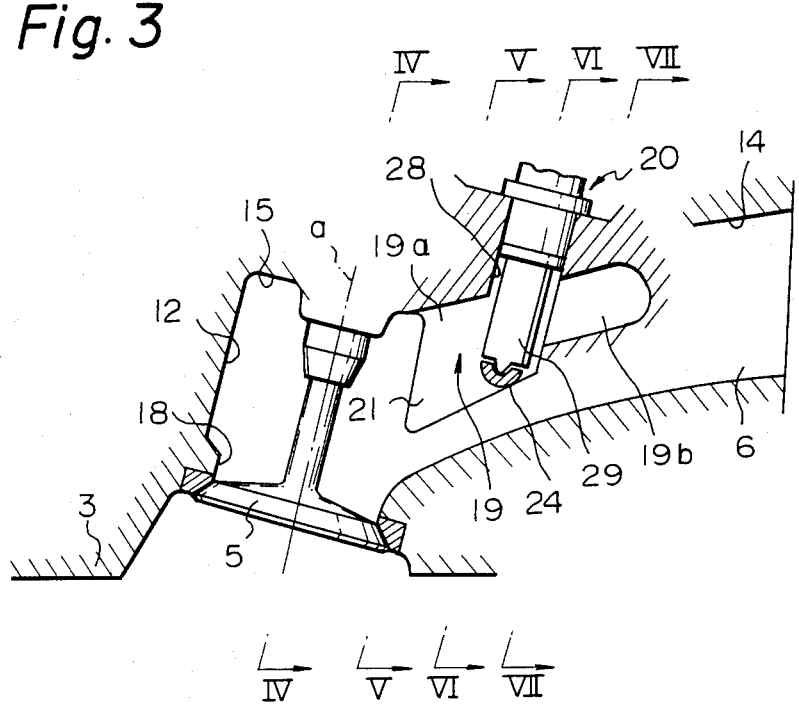
FIG. 3 is a cross-sectional side view of a helically-shaped intake port, taken along the bypass passage.
Figure 4:
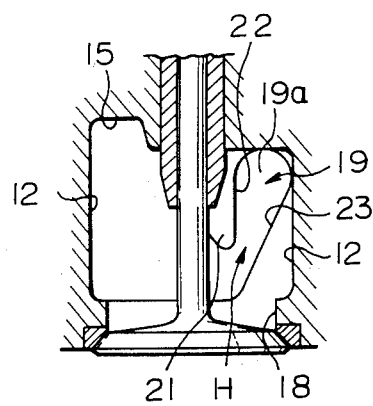
FIG. 4 is a cross-sectional view taken along the line IV—IV in FIG. 3.
Figure 11:
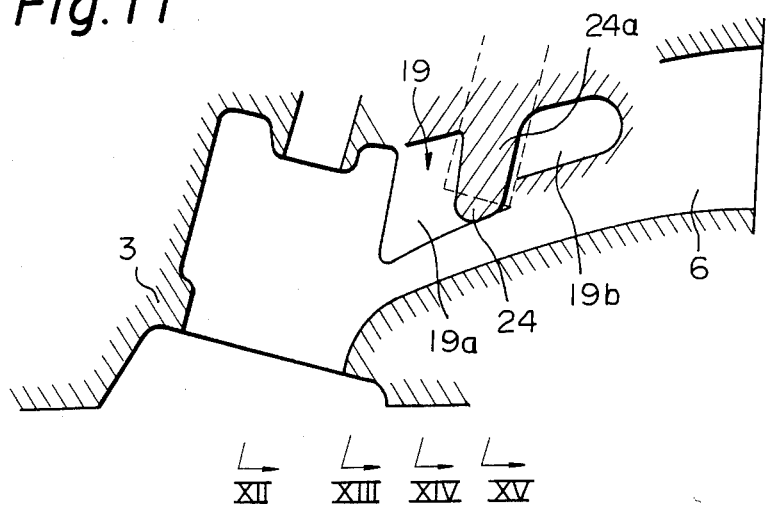
FIG. 11 is a cross-sectional side view of a helically-shaped intake port under a manufacturing process, taken along the bypass passage.
Figure 14:
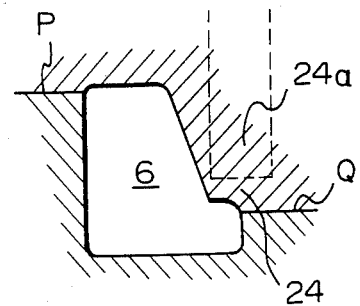
FIG. 14 is a cross-sectional view taken along the line XIV—XIV in FIG. 11.
Figure 15:
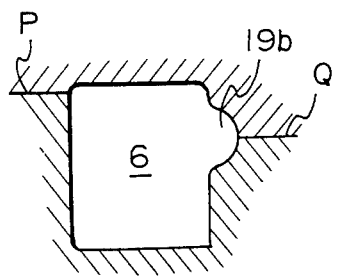
FIG. 15 is a cross-sectional view taken along the line XV—XV in FIG. 11.
Figure 16:
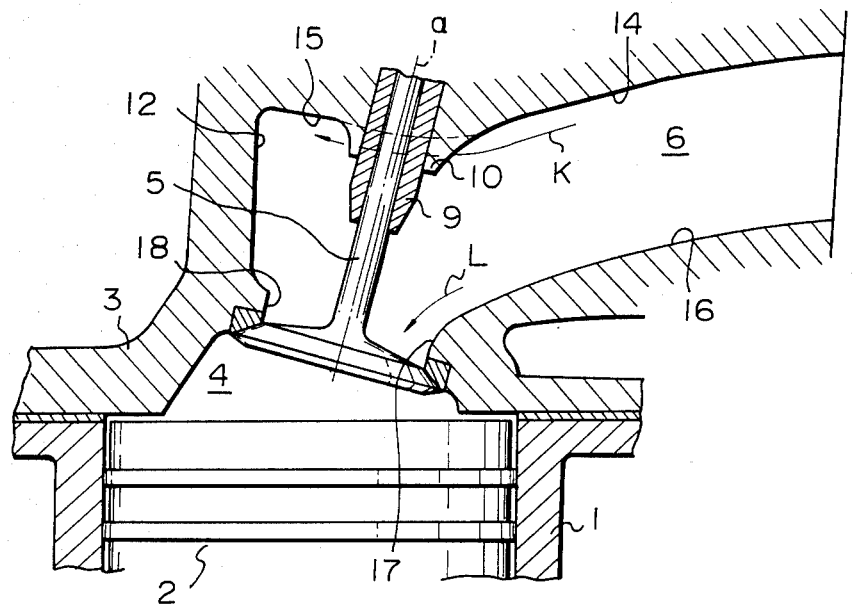
FIG. 16 is a cross-sectional side view of an alternative embodiment of a helically-shaped intake port according to the present invention, taken along the inlet passage portion.
Figure 17:
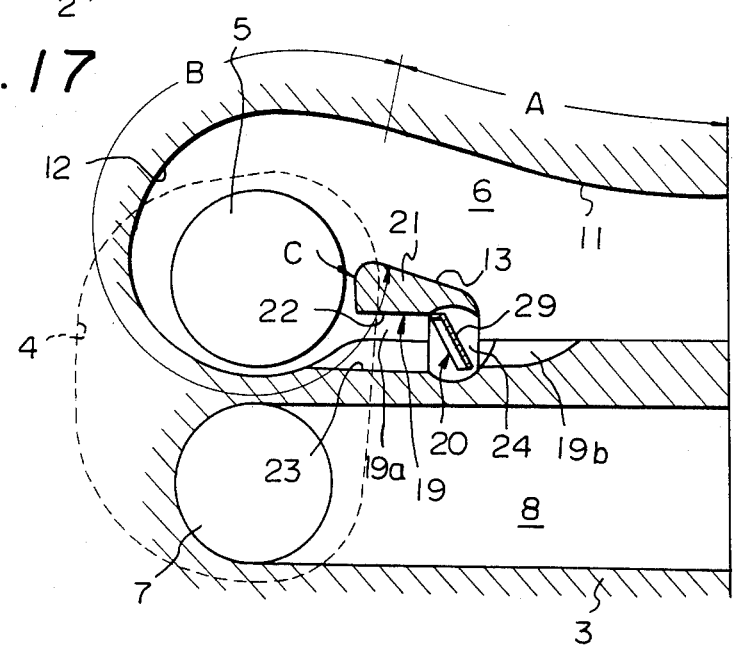
FIG. 17 is a cross-sectional plan view of the cylinder head illustrated in FIG. 16.
Figure 18:
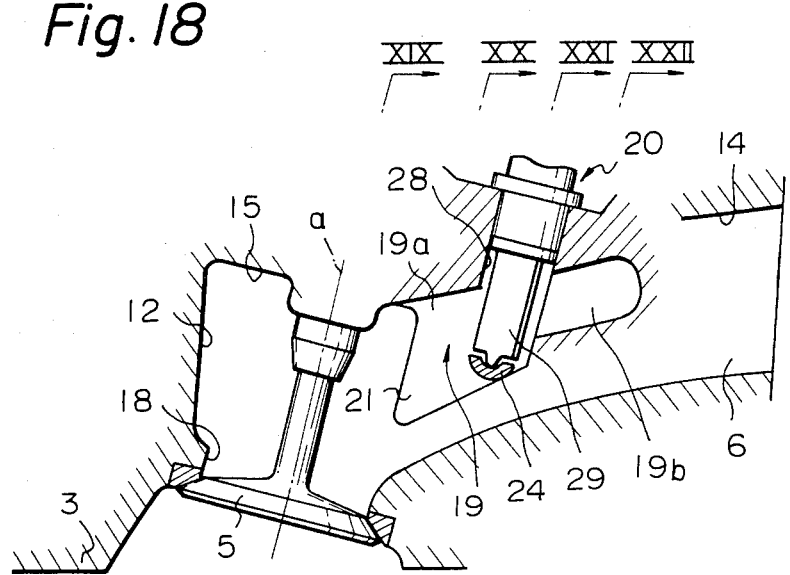
FIG. 18 is a cross-sectional side view of the helically-shaped intake port illustrated in FIG. 16, taken along the bypass passage.
Figure 19:
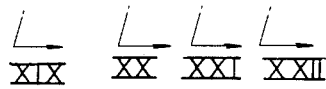
FIG. 19 is a cross-sectional view taken along the line XIX—XIX in FIG. 18.
Figure 19:
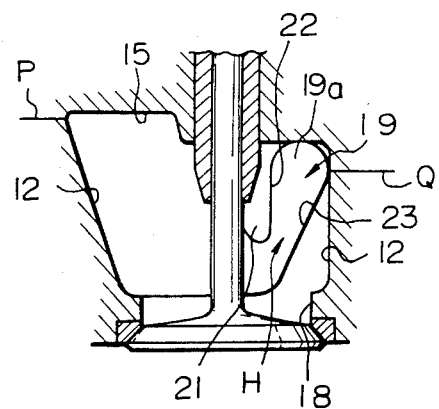
Figure 20:
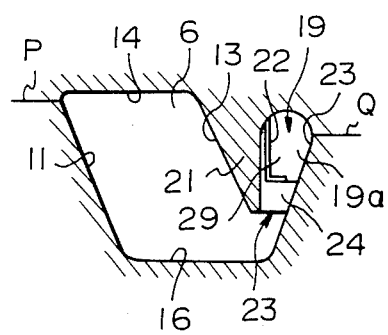
FIG. 20 is a cross-sectional view taken along the line XX—XX in FIG. 18.

In order to form the helically-shaped intake port 6 hereinbefore described in the cylinder head 3, a core having the shape of the helically-shaped intake port 6 is initially formed by using molds. Then, the helically-shaped intake port 6 is formed in the cylinder head 3 by using the core thus formed. FIGS. 11 through 15 illustrate the helically-shaped intake port 6 formed in the cylinder head 3 by using the core which is formed by the split two molds. As is understood from FIG. 11 in comparison with FIG. 3, in the helically-shaped intake port 6 illustrated in FIG. 11, the upper portion 24a of the bridge 24, into which the rotary valve 20 should be inserted, continuously extends to the upper wall of the bypass passage 19. This is because, if the upper portion 24a is not provided, it is impossible to form the core by the two split molds. In FIGS. 12 through 15, the straight lines P and Q indicate parting lines of the upper mold and the lower mold which are used when the core is formed. From FIG. 4, it is understood that, if the upper portion 24a is not provided, it is impossible to form the core by the two split molds. Consequently, in order to form the helically-shaped intake port 6 in the cylinder head 3, the helically-shaped intake port 6, provided with the upper portion 24 of the bridge 24, is initially formed in the cylinder head 3. Then, the region illustrated by the broken line in FIGS. 11 and 14 is removed by drilling from the top face of the cylinder head 3. As a result of this, the valve insertion bore 28 illustrated in FIG. 3 is formed, and at the same time, the bridge 24 is formed.

FIGS. 16 through 23 illustrate an alternative embodiment. In this embodiment, the side wall 11 of the inlet passage portion A, which is located remote from the helix axis a, is inclined so as to be directed upward. Thus, the upper portion of the side wall 11 expands outward relative to the lower portion of the side wall 11. In addition, the side wall 12 of the helical portion B has an inverted frustum shape so that the upper wall 12 leaves from the helix axis as the upper wall 12 approaches the upper wall 15. In this embodiment, as mentioned above, since the upper portions of the side wall 11 of the inlet passage portion A and the side wall 12 of the helical portion B expand outward relative to the lower portions of the side walls 11 and 12, respectively, the widths of the upper walls 14 and 15 become wide, and the distance between the helix axis a and the upper end of the side wall 12 of the helical portion B becomes long. Consequently, since the momentum of the mixture flowing along the upper wall 15 of the helical portion B becomes large, and the mass of the mixture flowing along the upper wall 15 of the helical portion B is increased, it is possible to create a strong swirl motion in the helical portion B. In addition, in FIGS. 19 through 22, the straight lines P, Q indicate parting lines of the upper mold and the lower mold which are used when the core is formed. From FIGS. 19 through 22, it will be understood that the core can be formed by the two split molds. Furthermore, in this embodiment, the bridge 24 may be omitted.

According to the present invention, since the core can be formed by the two split molds, it is possible to easily form the helically-shaped intake port in the cylinder head. In addition, by forming the inclined side wall in the inlet passage portion, since the mixture flowing along the upper wall of the inlet passage portion can be speeded up when the engine is operating at a low speed under a heavy load, it is possible to create a strong swirl motion. Furthermore, when the engine is operating at a high speed under a heavy load, it is possible to obtain a high volumetric efficiency due to the inflow of the mixture from the bypass passage into the helical portion and due to the swirl motion suppressing operation caused by the inclined side wall.

While the invention has been described with reference to specific embodiments chosen for the purpose of illustration, it should be apparent that numerous modifications can be made thereto by those skilled in the art without departing from the spirit and scope of the invention.

I claim:

1. An intake device of an internal combustion engine comprising:

an intake valve having a valve stem;

an axially extending intake port passage having an inlet opening at one end thereof and having an outlet opening at the other end thereof, said intake port passage having a substantially cylindrically extending circumferential wall which circumferentially extends about said valve stem for defining therein a helical portion having a helix terminating portion, a first side wall which extends between said inlet opening and said circumferential wall along an axis of said intake port passage, a second side wall which extends between said inlet opening and said circumferential wall along the axis of said intake port passage and is arranged to face said first side wall, an upper wall which extends between said inlet opening and said circumferential wall along the axis of said intake port passage, and a bottom wall which extends between said inlet opening and said circumferential wall along the axis of said intake port passage;

a separating wall projecting downwardly from said upper wall and spaced from said bottom wall, said separating wall extending along the axis of said intake port passage and being spaced from said first side wall for defining therebetween an inlet passage portion tangentially connected to said helical portion, said separating wall being spaced from said second side wall for defining therebetween a bypass passage which interconnects said inlet passage portion to said helix terminating portion;

normally closed valve means arranged in said bypass passage and having a lower end which is spaced from said bottom wall for controlling the flow area of said bypass passage; and actuating means for actuating said valve means in response to the change in the operating condition of the engine to open said valve means when the engine is operating at a high speed under a heavy load.

2. An intake device according to claim 1, wherein said separating wall has a downstream end face defining a portion of said circumferential wall.

3. An intake device according to claim 1, wherein said separating wall has an inclined side wall defining said inlet passage portion and directed downward.

4. An intake device according to claim 1, wherein said device comprises a frustum-shaped projection formed around said valve stem and projecting downwardly from said upper wall, an upper portion of the inclined side wall of said separating wall being smoothly connected to a circumferential wall of said frustum-shaped projection.

5. An intake device according to claim 1, wherein said separating wall has a bottom wall spaced from the bottom wall of said intake port passage and gradually approaching the bottom wall of said intake port passage as the bottom of said separating wall approaches said helical portion.

6. An intake device according to claim 1, wherein said upper wall, located between said separating wall and said first side wall, has a width which is gradually reduced towards said helical portion.

7. An intake device according to claim 1, wherein said first side wall is substantially vertically arranged.

8. An intake device according to claim 1, wherein said first side wall is inclined so as to be directed upward, said circumferential wall having an inverted frustum-shape.

9. An intake device according to claim 1, wherein said bottom wall is substantially flat and has a transverse width which is gradually increased towards said helical portion.

10. An intake device according to claim 1, wherein said separating wall has a transverse width which is gradually increased towards said helical portion.

11. An intake device according to claim 10, wherein said separating wall has an approximately triangular-shaped horizontal cross-section.

12. An intake device according to claim 1, wherein said separating wall has a substantially vertical side wall defining said bypass passage, said bypass passage comprising a first bypass passage portion located upstream of said valve means, and a second bypass passage portion located downstream of said valve means, said second side wall which defines said second bypass passage portion being inclined so as to be directed upward for defining a narrow width space between said second side wall and a lower end portion of the vertical side wall of said separating wall.

13. An intake device according to claim 12, wherein said first bypass passage portion is formed in a semi-circular cross-sectional groove which is open to said inlet passage portion.

14. An intake device according to claim 1, wherein said valve means extends from the upper wall of said bypass passage to a lower end of said separating wall for forming a mixture flow space between said bottom wall and a lower end of said valve means.

15. An intake device according to claim 14, wherein said valve means comprises a rotary valve rotatably arranged in said bypass passage.

16. An intake device according to claim 15, wherein said rotary valve has a thin plate-shaped valve body extending between said upper wall and the lower end of said separating wall.

17. An intake device according to claim 16, wherein said device comprises a bridge interconnecting the lower end of said separating wall to said second side wall, said valve body having a lower end which is supported on said bridge.

18. An intake device according to claim 1, wherein said actuating means actuates said valve means in response to the amount of air fed into said intake port passage and opens said valve means when said amount of air is increased beyond a predetermined value.

19. An intake device according to claim 18, wherein said actuating means comprises a vacuum chamber, a diaphragm connected to said rotary valve and actuated in response to a change in the level of the vacuum in said vacuum chamber, and a control apparatus maintaining the level of the vacuum in said vacuum chamber at the maximum vacuum which has been produced in the intake port passage when the amount of air fed into the intake port passage is smaller than said predetermined value and connecting said vacuum chamber to the atmosphere when said amount of air is larger than said predetermined value.

20. An intake device according to claim 19, wherein said control apparatus comprises a check valve arranged between the intake port passage and said vacuum chamber for allowing only the outflow of air from said vacuum chamber, and a control valve for controlling the fluid connection between said vacuum chamber and the atmosphere to connect said vacuum chamber to the atmosphere when said amount of air is larger than said predetermined value.

21. An intake device according to claim 20, wherein the engine comprises a carburetor connected to the intake port passage and having a venturi portion, said control valve being actuated in response to a change in the level of the vacuum produced in said venturi portion.

22. An intake device according to claim 21, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *